United States Patent [19]

Mahoney

[11] Patent Number: 4,685,831
[45] Date of Patent: Aug. 11, 1987

[54] APPARATUS AND METHODS FOR REMOVING UNDERGROUND CABLE

[75] Inventor: Robert L. Mahoney, Arnold, Mo.

[73] Assignee: Pierre L. LaBarge, Jr., St. Louis, Mo.; a part interest

[21] Appl. No.: 782,083

[22] Filed: Sep. 30, 1985

[51] Int. Cl.⁴ .............................................. F16L 1/00
[52] U.S. Cl. ..................... 405/156; 83/176; 254/134.3 SC; 405/154; 405/184
[58] Field of Search .............. 405/154, 177, 183, 184, 405/168; 254/29 R, 134.3 SC, 134.3 R; 83/318, 176

[56] References Cited

U.S. PATENT DOCUMENTS

| 12,718 | 4/1855 | Emerson . | |
|---|---|---|---|
| 590,219 | 9/1897 | Grubb . | |
| 2,297,164 | 9/1942 | Rainwater | 254/29 R |
| 2,752,797 | 7/1956 | Sherwin | 254/134.3 R X |
| 2,802,366 | 2/1954 | Borner . | |
| 3,078,074 | 2/1963 | Benedict | 254/333 |
| 3,104,792 | 4/1962 | Walton | 226/193 |
| 3,182,877 | 5/1965 | Slator et al. | 254/29 R X |
| 3,343,739 | 9/1967 | Kinnan | 405/177 X |
| 3,685,306 | 8/1972 | Mott | 405/168 |
| 3,722,775 | 3/1973 | Sarracino et al. | 226/100 |
| 3,794,233 | 2/1974 | Dykmans | 226/183 |
| 3,799,016 | 3/1974 | McVaugh | 83/176 |
| 4,018,058 | 4/1977 | Eichenseber et al. | 405/154 |
| 4,186,894 | 2/1980 | Brown | 254/134.3 R X |
| 4,318,638 | 3/1982 | Promersberger et al. | 405/177 |
| 4,447,013 | 5/1984 | Sandered et al. | 254/134.3 R X |

Primary Examiner—Dennis L. Taylor
Attorney, Agent, or Firm—Senniger, Powers, Leavitt and Roedel

[57] ABSTRACT

A cable removing apparatus having a sheave with a fixed, annular, channel-shaped circumferential groove which is intermittently interrupted. The cable is held in frictional engagement with a portion of the circumference of the sheave. A motor is provided for rotating the sheave with the cable engaged in the channel-shaped groove thereof so as to cause the cable to pass about a portion of the circumference of the sheave. In one embodiment, a plurality of teeth are formed in the groove to penetrate the cable to assist in gripping it for removal. Also disclosed is a method utilizing the apparatus to remove continuous lengths of underground cable.

3 Claims, 7 Drawing Figures

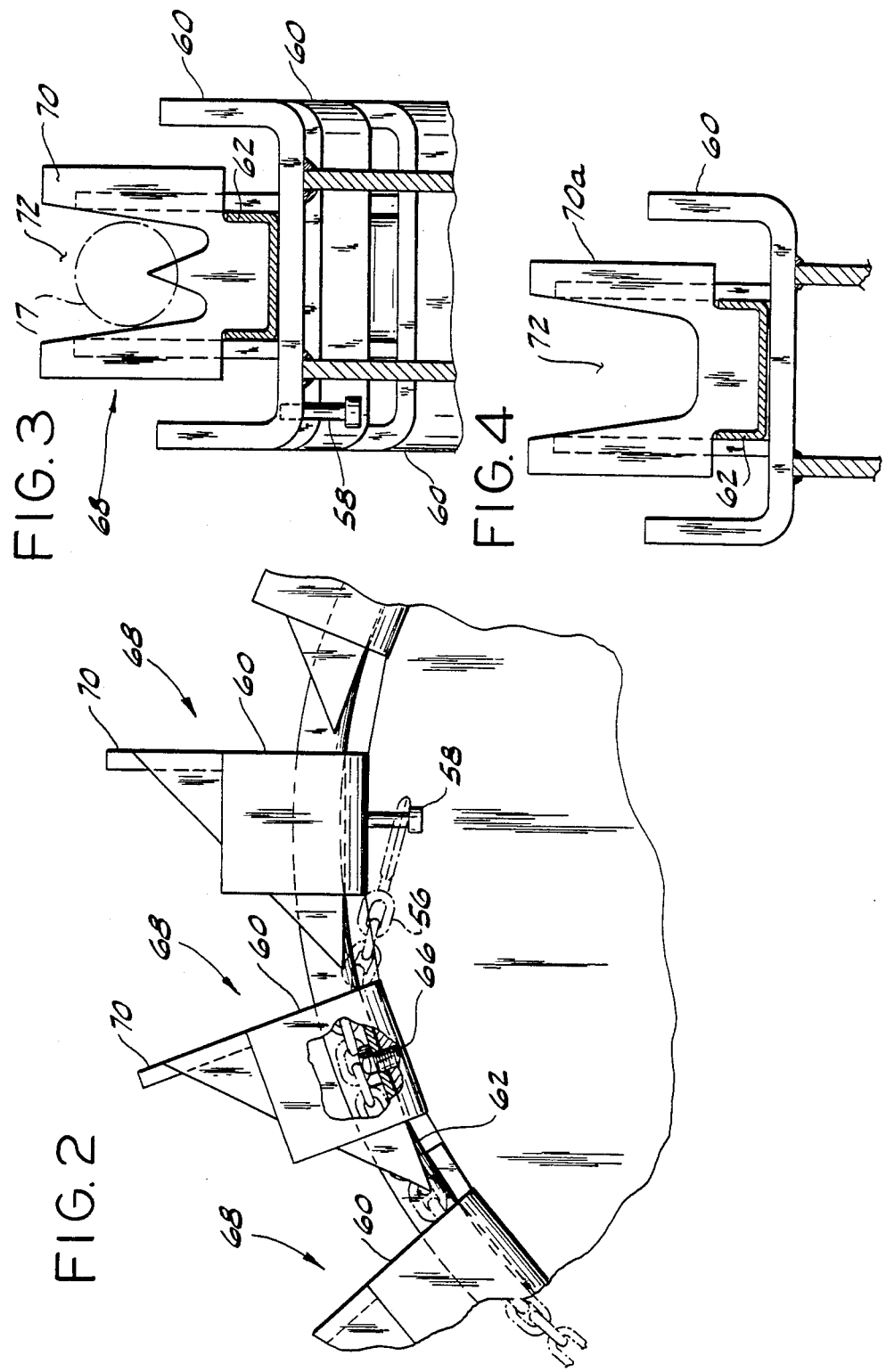

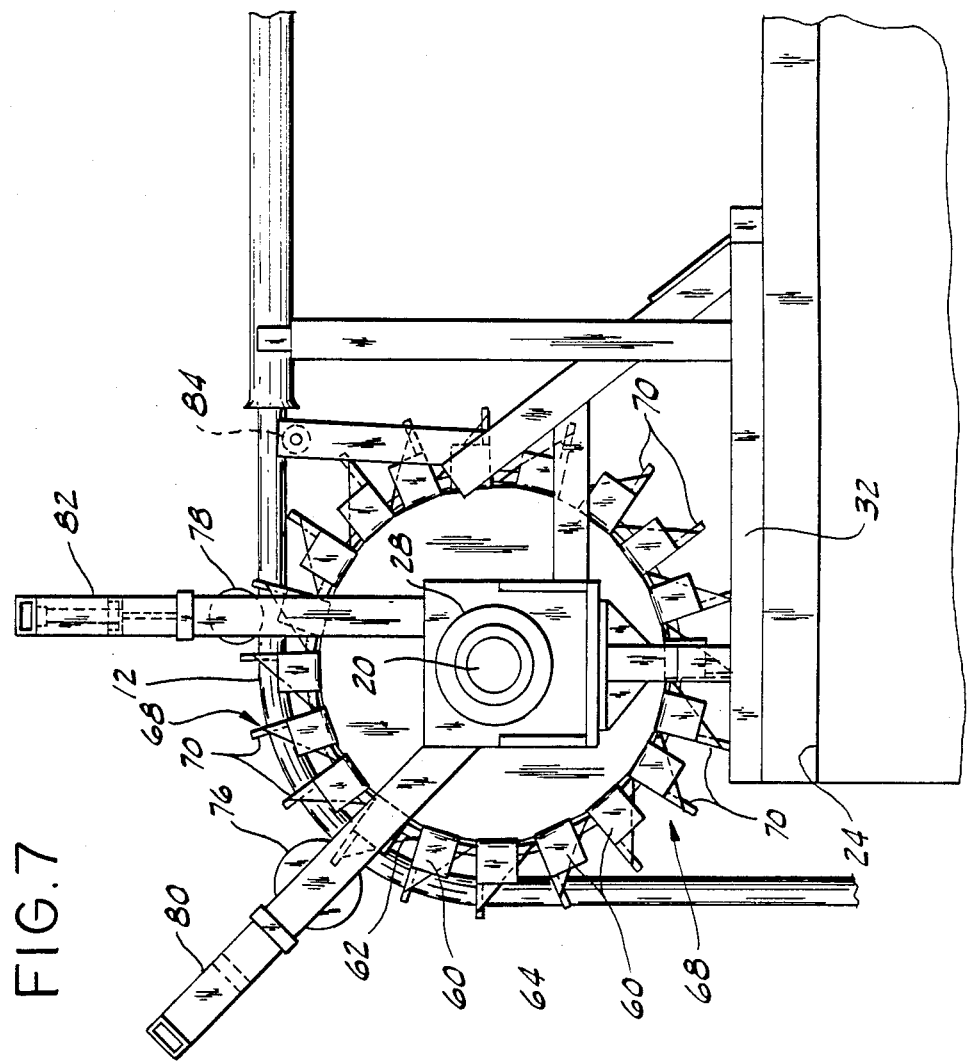

APPARATUS AND METHODS FOR REMOVING UNDERGROUND CABLE

BACKGROUND OF THE INVENTION

This invention relates generally to apparatus and methods for removing underground cables, and more particularly to such apparatus and methods which pulls the cable by means of a rotating wheel or sheave.

Often it is desired to remove telephone cable and the like which has been placed underground for long periods of time and needs to be replaced. Typically, the cable is actually located in a clay, ceramic or plastic duct. However, over the years the cable becomes fixed in sections of duct due to dirt accumulation and shifting of the sections of the duct so that it becomes extremely difficult to remove without digging up the entire length of cable.

Such cable is usually constructed of a core comprising hundreds of twisted pairs of insulated wire conductors surrounded by a sheath of plastic or lead. It is essential that the entire cable, both sheathing and the bundled core of conductors, be removed in order that the duct can be reused to lay a new cable. The lead sheathing used in much of the cable being removed at this time is in such condition and quality that generally it tends to separate or disintegrate when attempts are made to remove it with conventional equipment such as a winching arrangement that grips the end of the cable and pulls out a section which is then cut off and the next section is removed. Thus, removal progresses intermittently. Similar problems exist with the plastic sheathed underground cable.

Several problems result from such intermittent progress. One problem is that each pull must overcome static friction. Another problem is that the stresses created by such intermittent motion allows the withdrawal of only a relatively short length of cable, and so a new hole must be dug and the equipment remobilized to a new work position to continue the removal of the cable.

SUMMARY OF THE INVENTION

Among the several objects of this invention may be noted the provision of apparatus and methods that can remove underground cable by a continuous process; the provision of an apparatus and methods which avoid the necessity of overcoming static friction except on the initial pulling; and the provision of apparatus and methods which allow the removal of cable in greater lengths than possible by prior art apparatus and methods.

Generally, cable removing apparatus of this invention comprises a sheave means having a fixed, annular, channel-shaped circumferential groove which is intermittently interrupted, means engageable with the cable for holding the cable in frictional engagement with a portion of the circumference of the sheave means, and means for rotating the sheave means with the cable engaged in the channel-shaped groove thereof so as to cause the cable to pass about the portion of the circumference of the sheave means.

In one embodiment of the invention, teeth are formed in the groove to penetrate the cable so as to grapple the cable through engagement with the bundled wire core as well as the sheathing.

In accordance with methods of the present invention, the cable is introduced at a tangent to a fixed, annular, channel-shaped groove formed about the circumference of a sheave, which groove is intermittently interrupted, for frictionally engaging the cable by the sheave, rotating the sheave so as to draw the cable in the groove about a portion of the circumference of the sheave, and maintaining the cable in engagement with the sheave by engaging the surface of the cable with means disposed adjacent the sheave. Other objects and features will be in part apparent and in part pointed out hereinafter.

The invention accordingly comprises the constructions and methods hereinafter described, the scope of the invention being indicated in the following claims.

BRIEF DESCRIPTION OF THE DRAWINGS

FIG. 2 is a side view of a portion of a sheave component of the present invention;

FIG. 3 is a partial sectional view of a sheave showing a support flange and plate with a tooth formed in the v-shaped groove;

FIG. 4 is a partial sectional view of an alternative embodiment of the sheave shown in FIG. 3 wherein there is no tooth in the bottom of the groove;

FIG. 7 is a side view of the sheave and other portions of the apparatus of the present invention.

Corresponding reference characters indicate corresponding parts throughout the several views of the drawings.

DETAILED DESCRIPTION OF PREFERRED EMBODIMENTS AND METHODS

Figure 1:
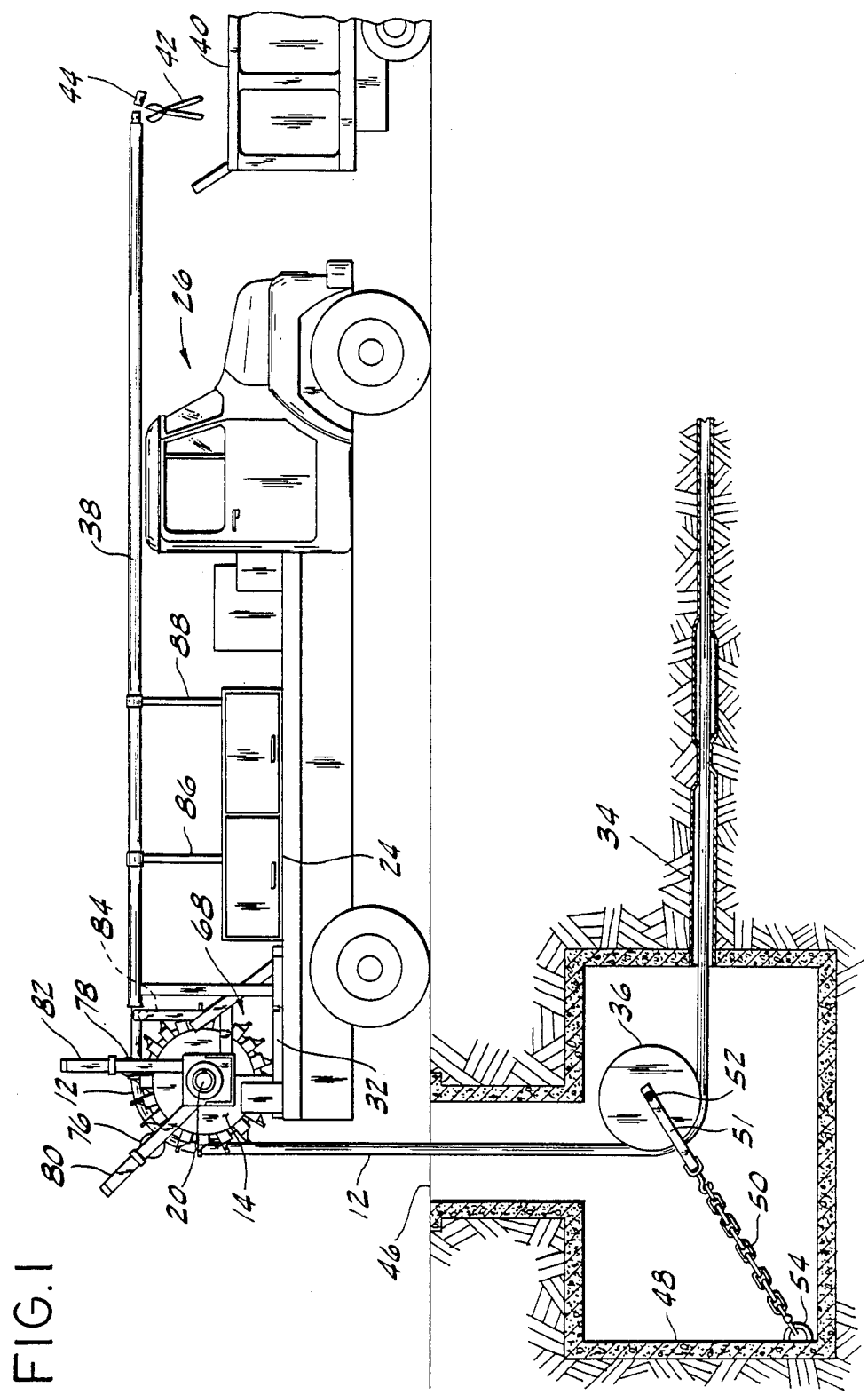
FIG. 1 is a side view of apparatus of the present invention mounted on the bed of a truck and positioned for removal of cable from an underground duct in accordance with a method of this invention.
Figure 5:
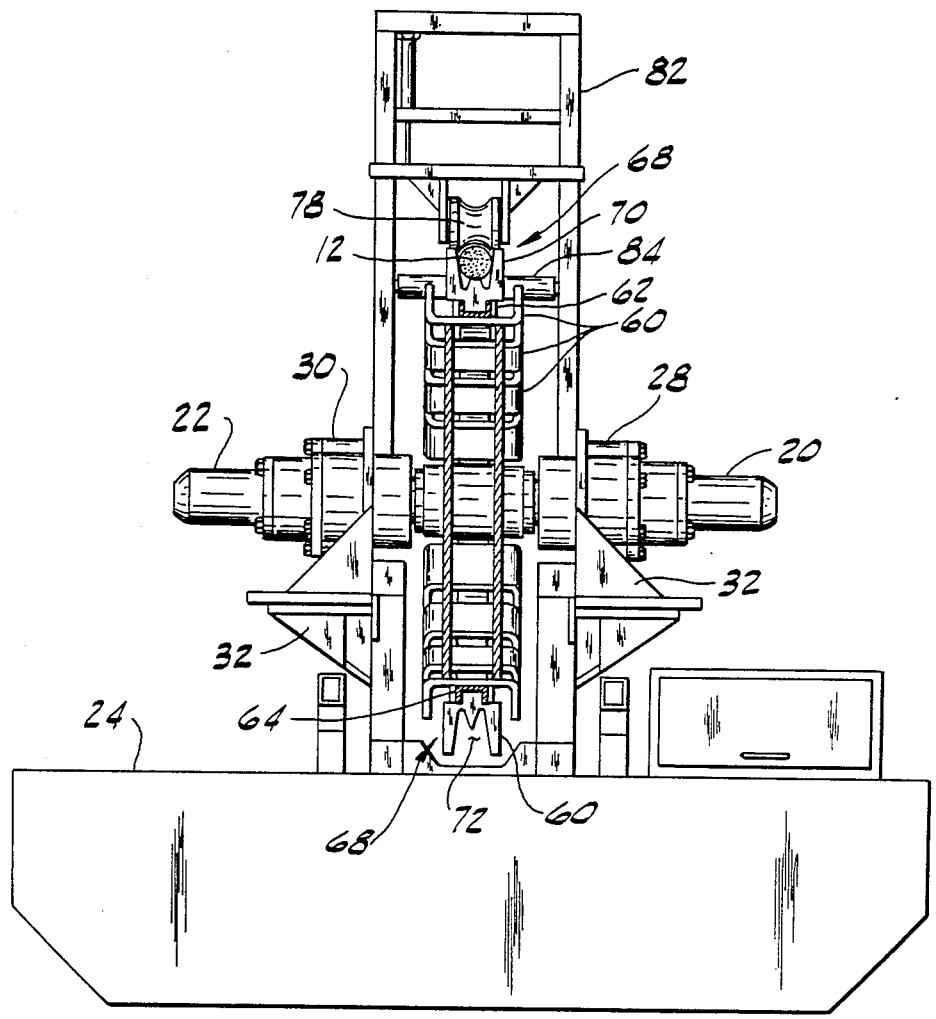
FIG. 5 is a rear view of the embodiment of FIG. 1 in partial cross-section.

Referring now to the drawings, indicated generally at 10 is an apparatus of this invention for removing an underground cable 12. Apparatus 10 includes a sheave 14, rotatable about a shaft 16, (FIG. 6) and having a fixed, annular, channel-shaped groove 18 formed therein about its circumference. A pair of hydraulically operated motors 20 and 22 on opposite sides of sheave 14 are mounted on the bed 24 of truck 26 for rotation, through gear reduction units 28 and 30, respectively, which in turn are rigidly mounted to a rigid framework 32. As viewed in FIG. 1, rotation of sheave 14 pulls cable 12 out of an underground duct 34, around a pulley 36 up to and around part of the circumference of sheave 14, and through a feed conduit 38. The cable is fed through a feed conduit 38, which constitutes means for removing the cable from the sheave, to a receptacle 40, such as a dump truck. As the cable exits the feed conduit 38 it is sheared or cut by severing or cutting means, such as hydraulically operated shears 42, into pieces 44 of convenient length.

To remove an underground cable 12, truck 26 with apparatus 10 mounted on truck bed 24 is driven to an underground cable installation and positioned at a location where sheave 14 of apparatus 10 is situated generally above a manhole 46 or the like. Inside the manhole, pulley 36 is anchored to the rigid side wall 48 by means of chain 50 which is connected at one end by means of a clevis 51 to axle 52 of pulley 36 and at the other end to the wall 48 by anchor 54, as shown in FIG. 1. Chain 50 should be connected to wall 48 at a point below the height of duct 34. It should be of a length such that as the cable 12 is pulled out of the duct 34 and around pulley 36, thereby imparting a force on pulley 36 upward and toward the side of the manhole 46 where the duct opening is, the cable 12 moves out of the duct 34 substantially horizontally, meeting the bottom of pulley 36 tangentially and leaving pulley 36 tangentially and substantially vertically through the access hole of manhole 46 without interference from the sides thereof. Pulley 36, therefore, acts to convert the substantially horizontal movement of cable 12 to substantially vertical movement.

Next, as shown in FIG. 2, to begin removing cable from the ground, one end of a chain 56 is attached to sheave 14 by slipping the end link over post 58 secured to sheave 14. The other end of chain 56 is fed down into manhole 46, around pulley 36 and attached to cable 12. Hydraulic motors 20 and 22 in conjunction with gear reduction units 28 and 30 rotate shaft 16 supporting sheave 14, causing chain 56 to be wrapped around the circumference of sheave 14 which causes underground cable 12 to be pulled from the duct 34, around pulley 36 and up to sheave 14.

Figure 6:
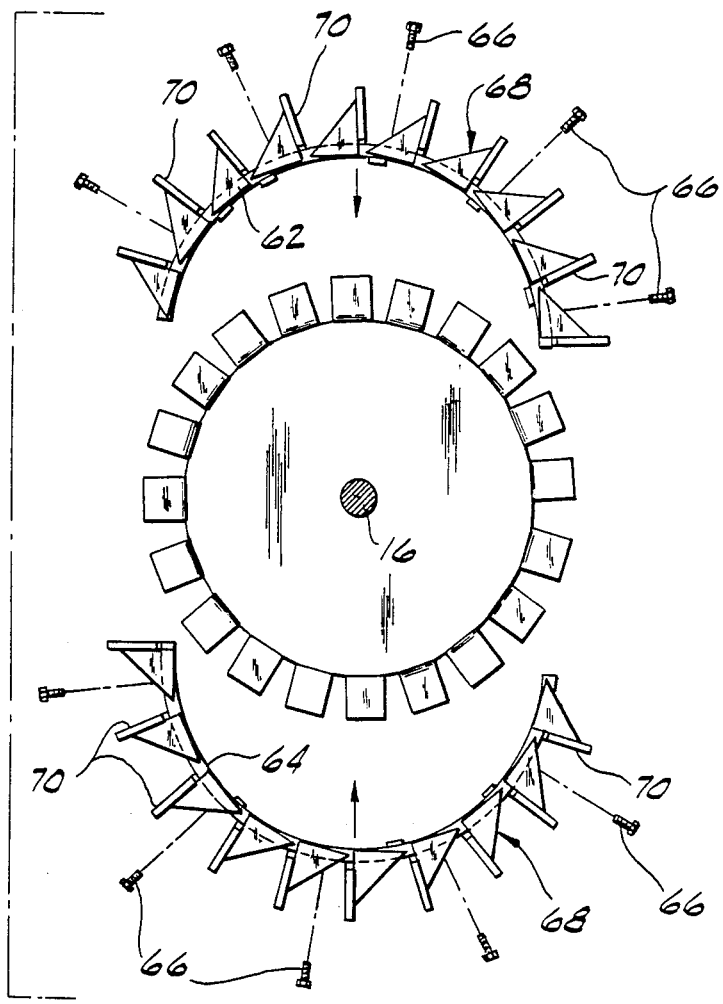
FIG. 6 is an exploded side view of the sheave shown in FIG. 1.

Referring now to FIG. 6, sheave 14 is formed of generally U-shaped flanges 60, which are mounted about the circumference of the sheave at equally radially spaced locations. As depicted in FIGS. 3 and 4, flanges 60 extend radially outwardly from the circumference at each side of the sheave 14, forming a generally curved channel-shaped periphery of sheave 14. Two semi-circular members 62 and 64 fit within that portion of the generally curved channel-shaped periphery of sheave 14 formed by flanges 60, as shown in FIG. 6, and are bolted to the flanges 60 with bolts 66. Semi-circular members 62 and 64 then, taken together, form a snugly fitting ring about the circumference of sheave 14.

Semi-circular members 62 and 64 are formed by several interconnected sections 68 each of which has a contoured plate 70 which extends radially outwardly and, when viewed in crosssection, parallel to shaft 20 as in FIGS. 3 and 4, thereby forming a generally V-shaped groove 72. The dimensions of the groove 72 must be such that the cable 12 can be jammed or wedged into the opening so that the rigidly disposed sides of the plate 70 forming the V-shaped groove 72 grip the cable 12. Generally, the cable encountered is two to three inches in diameter the plate 70 having a groove with the sides converging inwardly at a 15 to 20 degree included angle and having a depth greater than the diameter of the cable.

Semi-circular members, 62 and 64 are removable so that one set of semi-circular members may be replaced with another embodiment of semi-circular members whenever so desired. One embodiment of semi-circular members 62 and 64 is shown in FIG. 3 as including teeth 74 formed in plates 70 in the bottom of the V-shaped groove and which project outwardly from the base of the groove. A lead-sheathed cable, for example, of the type typically used in the past for telephone cable, placed within the groove will be penetrated by the teeth 74 so that the teeth engage and grip or grapple the inner conductors or wires as well as the sheathing so that the sheathing does not rip free from around the bundled core of wires and be removed separately, thus leaving the stripped core of conductors which can only be extracted with great difficulty. It is desired that the teeth 72 penetrate the cable 12 by 25–35% of the cable diameter, but up to about 50% penetration could be used without encountering significant difficulty in, for example, removing the teeth 72 from the cable at high speeds of rotation.

Some plastic sheathed cables will not necessarily require the use of such teeth 74 where the length to be pulled is not great enough and/or the cable is not as fixed in its underground duct and thus the friction which has to be overcome is less. Therefore, a toothless plate 70a is provided as shown in FIG. 4. The cable is gripped by the frictional engagement of the cable with the walls of the plate 70a forming the V-shaped groove 72 as the cable is wedged down into it.

Referring again to FIG. 1, as cable 12 is raised and reaches sheave 14, the cable is gripped by the sheave 14 as described above. As the cable is pulled circumferentially by the rotating sheave 14, two idler rollers 76 and 78 insure that the cable is held or pressed into the V-shaped grooves 72 of plates 70 along the circumference of the sheave 14. Rollers 76 and 78 comprise means for holding the cable in frictional engagement with the sheave 14. They are mounted on frameworks 80 and 82 and are hydraulically moveable toward and away from sheave 14. Pulleys 76 and 78 maintain the cable 12 in the bight of grooves 72 and prevent lifting of the cable from the grooves 72 which the cable has a tendency to do because of its stiffness.

Once the cable is gripped by the sheave 14, the chain 50 is removed from the cable 12. The cable 12 may then be routed off the sheave 14 at a point directly above shaft 20, and fed through feed conduit 38. A roller 84, situated near and just below the entrance of the feed conduit 38, helps guide and support the cable 12 between the sheave 14 and the feed conduit 38. The feed conduit 38 is supported above the truck bed 24 by supports 86 and 88. The cable 12 moves through the feed conduit 38 to a point of exit from the feed conduit above the receptacle 40. As the cable 12 exits the feed conduit 38, a cutting means, such as shears 42, cuts the cable at desired intervals so that pieces 44 of convenient length are produced and loaded into the receptacle for subsequent reclamation.

In view of the above, it will be seen that the several objects of the invention are achieved and other advantageous results are obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for removing underground cable, such as telephone cable and the like having a core of conductors surrounded by a sheath, the apparatus comprising:

a sheave;

a plurality of generally U-shaped flanges equally spaced about the circumference of the sheave, the flanges extending radially outwardly from the sheave and forming a curved channel-shaped periphery on the sheave;

two semi-circular members removably secured over the flanges, the members forming a ring in the curved channel-shaped periphery of the sheave;

a plurality of plates extending radially outwardly from the semi-circular members, each plate having a v-shaped notch therein, the notches in the plates defining a discontinuous v-shaped groove around the circumference of the sheave for frictionally gripping the cable;

at least one roller;

means for moving the roller toward the sheave to insure that the cable is held in the v-shaped groove;

means for rotating the sheave with the cable gripped in the v-shaped groove to pull the cable around a portion of the circumference of the sheave.

2. The apparatus according to claim 1 further comprising at least one tooth in the bottom of each v-shaped notch, the tooth adapted to penetrate the cable and grapple the core so that the sheathing does separate from the core during removal.

3. The apparatus according to claim 2 wherein there is one tooth extending radially outwardly from the bottom of each v-shaped notch, the tooth adapted to penetrate the cable to between about 25% and about 35% of the cable diameter.

* * * * *